(12) United States Patent
Clark et al.

(10) Patent No.: US 7,364,034 B1
(45) Date of Patent: Apr. 29, 2008

(54) ADJUSTABLE APERTURE APPARATUS THAT RETAINS DUST FROM BULK MATERIAL DIRECTED THROUGH THE APPARATUS

(75) Inventors: Gregory A. Clark, Gallatin, TN (US); Ronald A. Westfall, Buffalo, MO (US); John S. Pircon, Oak Brook, IL (US)

(73) Assignee: Benetech Inc., Montgomery, IL (US)

( * ) Notice: Subject to any disclaimer, the term of this patent is extended or adjusted under 35 U.S.C. 154(b) by 0 days.

(21) Appl. No.: 11/776,373

(22) Filed: Jul. 11, 2007

(51) Int. Cl.
B65G 47/04 (2006.01)
(52) U.S. Cl. ...................... 198/525; 198/532
(58) Field of Classification Search ............... 198/525, 198/526, 532; 193/4, 14, 23, 29; 239/665, 239/666, 668, 669; 406/178; 222/269, 270, 222/286, 290, 291, 292
See application file for complete search history.

(56) References Cited

U.S. PATENT DOCUMENTS

| | | | |
|---|---|---|---|
| 3,858,733 A | | 1/1975 | Morioka et al. |
| 3,926,290 A | * | 12/1975 | Isojima et al. ................. 193/27 |
| 4,039,062 A | * | 8/1977 | Carre et al. ............... 193/31 R |
| 4,164,327 A | | 8/1979 | Clark |
| 4,489,862 A | * | 12/1984 | Diem .......................... 222/263 |
| 4,552,573 A | * | 11/1985 | Weis et al. .................... 55/312 |
| 4,603,769 A | * | 8/1986 | Bach et al. .................... 793/12 |
| 4,623,056 A | * | 11/1986 | Flaugher ..................... 193/23 |
| 5,123,542 A | | 6/1992 | Hoppe |
| 5,160,222 A | * | 11/1992 | Noland ....................... 406/124 |
| 5,190,132 A | | 3/1993 | Stanelle et al. |
| 5,248,344 A | | 9/1993 | Hoppe |
| 5,368,192 A | * | 11/1994 | Ransom, II ................. 221/277 |
| 5,372,229 A | | 12/1994 | Leibling |
| 5,441,321 A | * | 8/1995 | Karpisek ................. 294/68.21 |
| 5,697,408 A | | 12/1997 | Reeves |
| 5,769,573 A | * | 6/1998 | Faas et al. ................... 406/171 |
| 5,967,375 A | * | 10/1999 | Barnes ..................... 222/146.2 |
| 5,993,117 A | * | 11/1999 | Lancaster et al. ............. 406/3 |
| 6,921,037 B2 | | 7/2005 | Wysong et al. |
| 2006/0151280 A1 | | 7/2006 | Pircon et al. |

\* cited by examiner

*Primary Examiner*—Douglas A Hess
(74) *Attorney, Agent, or Firm*—Thompson Coburn LLP; Joseph M. Rolnicki, Esq.

(57) ABSTRACT

An adjustable aperture apparatus on a bulk material transfer chute that transfers a flow of bulk material from a discharge conveyor to a separate receiving conveyor is automatically closed when no bulk material is being transferred by the transfer chute from the discharge conveyor to the receiving conveyor. With the apparatus being closed, any residual dust from the bulk material remaining on the discharge conveyor is collected on the closed apparatus and primarily contained in the bulk material transfer chute. When bulk material is again conveyed on the discharge conveyor to the bulk material transfer chute, the conveyed bulk material is deposited on the closed aperture apparatus and the weight of the material causes the apparatus to automatically move to an opened condition, allowing the transfer of the collected dust with the bulk material supplied to the bulk material transfer chute to the receiving conveyor. The apparatus improves environmental conditions over the current art, improves health and safety conditions of personnel over the current art, and improves operational safety conditions in respect to explosion risk over the current art.

25 Claims, 4 Drawing Sheets

ADJUSTABLE APERTURE APPARATUS THAT RETAINS DUST FROM BULK MATERIAL DIRECTED THROUGH THE APPARATUS

BACKGROUND OF THE INVENTION

1. Field of the Invention

The present invention pertains to an adjustable aperture apparatus that is used on a bulk material transfer chute that transfers a flow of bulk material from a discharge conveyor to a separate receiving conveyor. In particular, the present invention pertains to an aperture apparatus that is automatically closed when no bulk material is being transferred by the transfer chute from the discharge conveyor to the receiving conveyor. With the apparatus being closed, any residual dust from the bulk material remaining on the discharge conveyor is collected on the closed apparatus and primarily contained in the bulk material transfer chute. When bulk material is again conveyed on the discharge conveyor to the bulk material transfer chute, the conveyed bulk material is deposited on the closed aperture apparatus and the weight of the material causes the apparatus to automatically move to an opened condition, allowing the transfer of the collected dust with the bulk material supplied to the bulk material transfer chute to the receiving conveyor. By collecting the residual dust on the apparatus in the bulk material transfer chute, and then combining the collected dust with the active flow of bulk material through the transfer chute, the aperture apparatus of the invention reduces dust emissions in the area of the transfer chute.

2. Description of the Related Art

The transporting of bulk material, for example coal, from one area to another often involves the transfer of a stream or flow of the material from one conveyor apparatus to another conveyor apparatus. In the transfer of the material from the one conveyor to the other conveyor, it is often necessary that the material be discharged from a discharge end of the one conveyor and transferred onto a receiving end of the other conveyor. To facilitate this transfer of bulk material, large hoppers or transfer chutes have been designed. These transfer chutes receive the flow of material from the discharge conveyor at the top of the chute and deposit or discharge the flow of material onto the other receiving conveyor at the bottom of the chute.

The transfer of bulk material, for example coal, through a transfer chute from the discharge end of one conveyor to the receiving end of a second conveyor inherently produces dust from the transferred bulk material. Most modern bulk material handling systems have been designed to adequately address the problem of dust emissions when the discharge conveyor and the receiving conveyor are operating at their fully loaded states. Basically, the dust created by the transfer of the bulk material from the discharge conveyor, through the transfer chute, to the receiving conveyor is primarily entrapped in the flow of the bulk material. However, when the discharge conveyor and receiving conveyor are operated in an empty state with there being no transfer of the bulk material from the discharge conveyor, through the transfer chute to the receiving conveyor, the dust remaining on the empty discharge conveyor is transferred to the transfer chute. The dust settles through the transfer chute and exits the bottom of the chute where it is emitted into the air surrounding the transfer chute. The airborne dust emissions present a safety and health hazard due to the dust being inhaled by persons working in the area of the transfer chute and the creation of a fire or explosion hazard.

SUMMARY OF THE INVENTION

The adjustable aperture apparatus of the invention overcomes the problems presented by the inherent emissions of bulk material dust at a transfer chute positioned between a discharge conveyor and a receiving conveyor. The apparatus improves environmental conditions over the current art, improves health and safety conditions of personnel over the current art, and improves operational safety conditions in respect to explosion risk over the current art. The adjustable aperture apparatus is designed to be attached at the outlet, bottom end of the transfer chute where the transfer chute would direct a flow of bulk material onto the receiving conveyor when the chute is supplied with bulk material from the discharge conveyor, and where dust accumulated on the empty discharge conveyor exits the transfer chute and becomes airborne in the area of a transfer chute The adjustable aperture apparatus of the invention is designed to automatically close when bulk material is not being transferred from the discharge conveyor, through the transfer chute, to the receiving conveyor. With the adjustable aperture apparatus closing the opening in the bottom of the transfer chute when the discharge conveyor and receiving conveyor are operated in an empty state due to the absence of active material flow, any dust transmitted to the interior of the transfer chute is prevented from exiting the transfer chute.

The adjustable aperture apparatus of the invention is basically comprised of a tube that is attached to the bottom opening of the transfer chute. A plurality of plates are secured to the cylindrical interior surface of the tube by pivoting connections. The pivoting connections enable the plurality of plates to pivot between closed, horizontal positions where the plates extend across and substantially close the interior bore of the tube, and opened, vertical positions where the plates extend downwardly against the cylindrical interior surface of the tube.

Torsion springs are operatively connected between the plates and the interior surface of the tube at the pivoting connections. The torsion springs cause the plates to pivot to their closed, horizontal positions when there is no load on the plates from bulk material being transferred into the transfer chute and emptying into the tube. When no load is present on the closed, horizontally positioned plates, the plates form a barrier that prevents unrestricted airflow through the chute, and thereby prevents emission of dust through the chute. Thus, when the discharge conveyor is being operated in an empty state, the flow of fine residual material dust through the transfer chute is restricted and the material dust settles on the closed, horizontally positioned plates.

The torsion springs of the plates are designed such that they can only support slightly more than the weight of the plate itself. Therefore, when bulk material is again conveyed by the discharge conveyor into the transfer chute and exits the chute through the tube, the collection of the transferred bulk material on the blades causes the blades to rotate away from their closed, horizontal positions toward their opened, vertical positions. Any dust emissions that had collected on the plates when in the closed, horizontal positions is then scoured away and combined with the flow of bulk material passing through the transfer chute and the tube.

In this manner, the adjustable aperture apparatus of the invention limits the omission of bulk material dust from a transfer chute when a discharge conveyor that supplies bulk material to the transfer chute is being operated in an empty state.

BRIEF DESCRIPTION OF THE DRAWINGS

Further features of the invention are set forth in the following detailed description of the invention and in the drawing figures.

DETAILED DESCRIPTION OF THE PREFERRED EMBODIMENT

Figure 1:
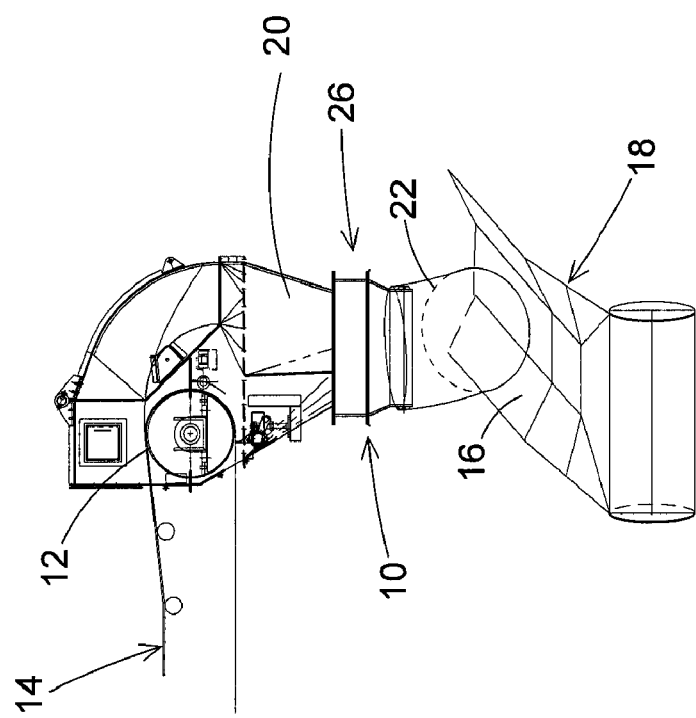
FIG. 1 shows a side elevation view of the positioning of the adjustable aperture apparatus of the invention on a transfer chute that communicates a discharge conveyor with a receiving conveyor.

FIG. 1 is a schematic representation of one operative environment of the adjustable aperture apparatus 10 of the present invention. It should be understood that the environment of FIG. 1 is only one example of an environment in which the apparatus 10 may be used. There are other environments where the apparatus of the invention is equally well suited for use.

In FIG. 1, the discharge end 12 of a first conveyor 14 is shown, and the receiving end 16 of a second conveyor 18 is shown. As stated earlier, in transporting bulk materials from one area to another, the relative positioning of the first conveyor 14 and the second conveyor 18 shown schematically in FIG. 1 is often employed. Bulk material, for example coal, is discharged from the discharge end 12 of the first conveyor 14 and falls to the receiving end 16 of the second conveyor 18.

To facilitate the transfer of the bulk material from the first conveyor 14 to the second conveyor 18, a large hopper or transfer chute 20 is positioned between the two conveyors. The transfer chute 20 receives the bulk material from the first conveyor 14 at the top of the chute, and directs or discharges the material onto the receiving end 16 of the second conveyor 18.

As stated earlier, often the transfer of bulk material, for example coal, through a transfer chute 20 such as that represented schematically in FIG. 1 produces dust. It is typical that the first conveyor 14 and second conveyor 18 are operated continuously, whether or not bulk material is being transported by the conveyors. Much of the dust created by the transfer of the bulk material from the first conveyor discharge end 12 to the second conveyor receiving end 16 is entrapped in the flow of bulk material. When the bulk material is not being conveyed by the first conveyor 14 to the second conveyor 18, the dust remaining on the empty first conveyor 14 is transferred to the transfer chute 20. The dust settles through the transfer chute 20 and exits the bottom of the chute where it is emitted into the air surrounding the transfer chute 20. The airborne dust emissions present a safety and health hazard.

Figure 2:
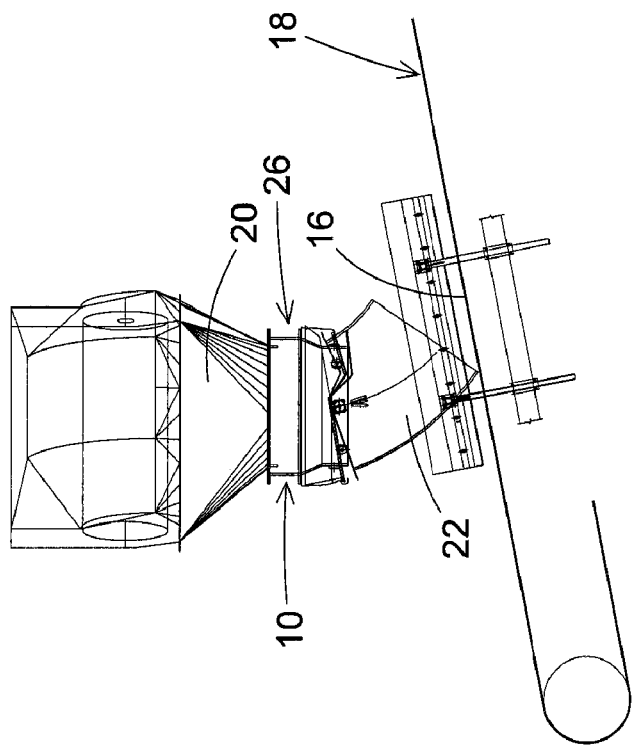
FIG. 2 is an elevation view similar to that of FIG. 1, but from the right side of FIG. 1.

The apparatus of the invention 10 is designed to be assembled to a transfer chute 20 such as that shown in FIG. 1 to overcome the problem of dust emissions. As shown in FIGS. 1 and 2, the apparatus 10 of the invention is designed to be assembled between the funnel-shaped portion of the transfer chute 20 and a loading chute 22 that directs the bulk material to the receiving end 16 of the second conveyor 18. As will be explained, the adjustable aperture apparatus 10 is designed to automatically close when bulk material is not being transferred from the first conveyor discharge end 12, through the transfer chute 20 to the second conveyor receiving end 16. With the adjustable apparatus closing the opening in the bottom of the transfer chute 20 when the first conveyor 14 and second conveyor 18 are operated in an empty state, any dust transmitted to the interior of the transfer chute 20 is prevented from exiting the transfer chute.

The adjustable aperture apparatus 10 is basically comprised of a tube 26 containing a plurality of plates 28, 32, 34, 36. The tube 26 is attached between the bottom of the transfer chute 20 and the top of the loading chute 22. The plurality of plates 28, 32, 34, 36 are mounted in the tube 26 by spring biased pivot connections that urge the plates to substantially horizontally aligned positions extending across the interior of the tube 26.

In the preferred embodiment of the invention, the tube 26 is cylindrical and is comprised of three sections. A first, large diameter section 38 connects the tube 28 to the transfer chute 20. A second, tapered section 42 extends downwardly from the first section 38. The tapered section 42 connects the first section to a third, small diameter section 44 of the tube. The small diameter section 44 of the tube is designed to be connected to the loading chute 22. The three interior surfaces 46, 48, 52 of the respective three tube sections 38, 42, 44 surround a hollow interior bore of the tube that has a center axis 54. The tube center axis 54 defines mutually perpendicular axial and radial directions relative to the tube 26. In the preferred embodiment of the apparatus, the tube 26 is positioned with the tube center axis 54 oriented vertically. This allows bulk material to flow freely through the tube from a circular top edge 56 of the tube that defines a top opening, to a circular bottom edge 58 of the tube that defines a bottom opening.

Figure 3:
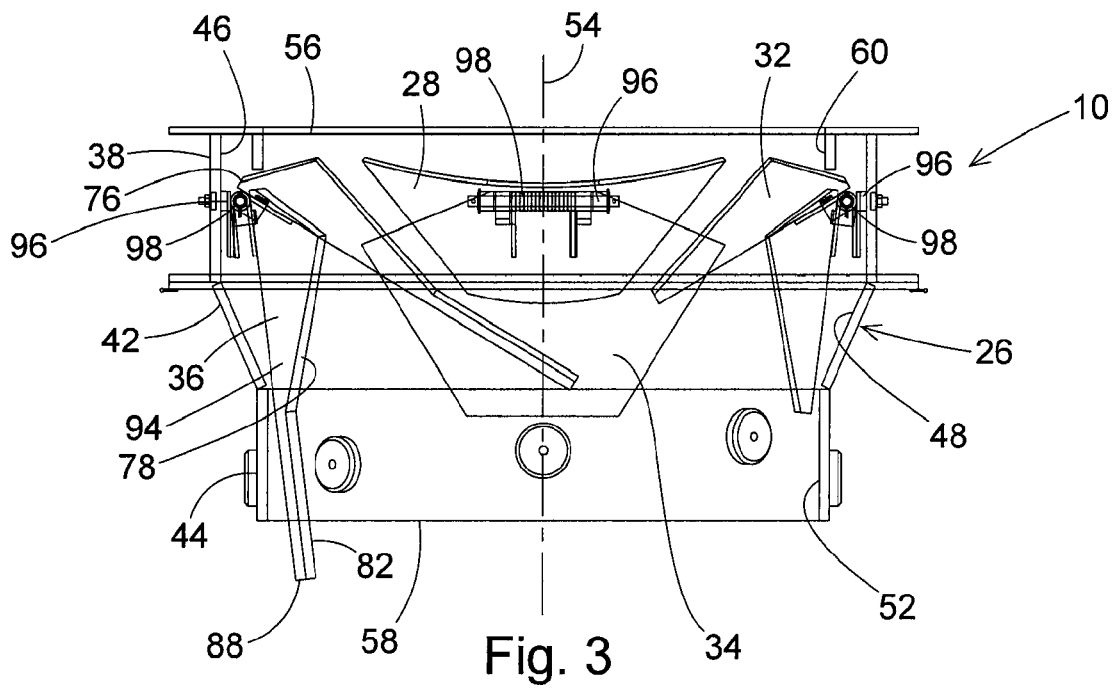
FIG. 3 is a side elevation view of the adjustable aperture apparatus of the invention removed from the transfer chute of FIG. 1.
Figure 4:
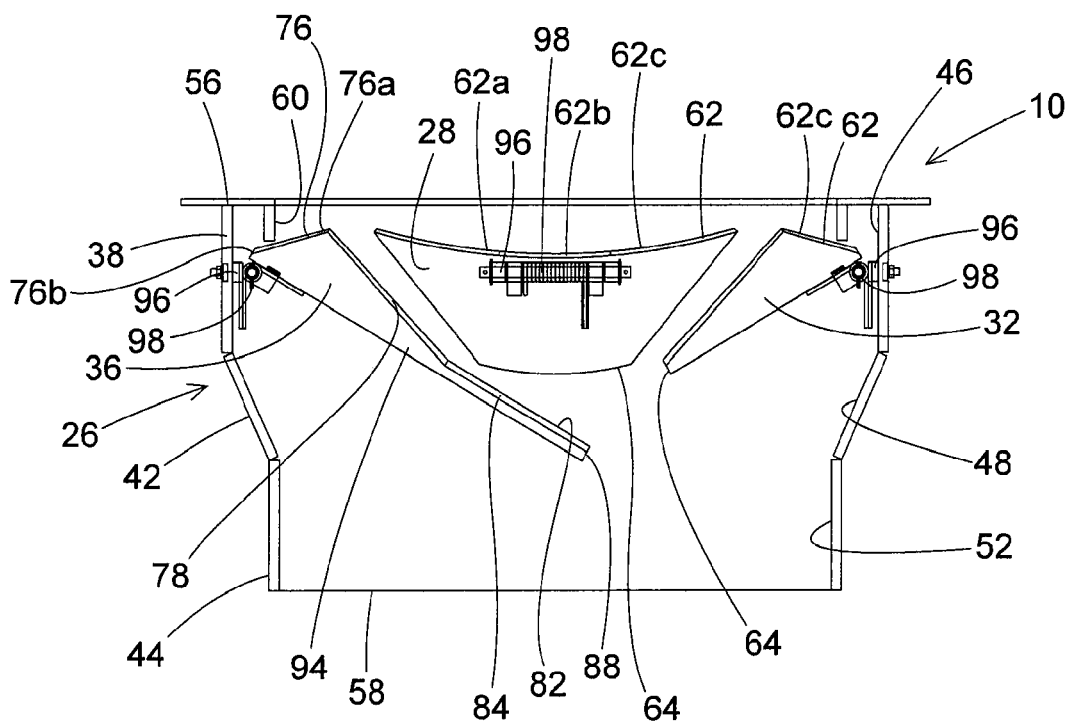
FIG. 4 is a side sectioned view of the apparatus with the apparatus plates in their closed positions.
Figure 6:
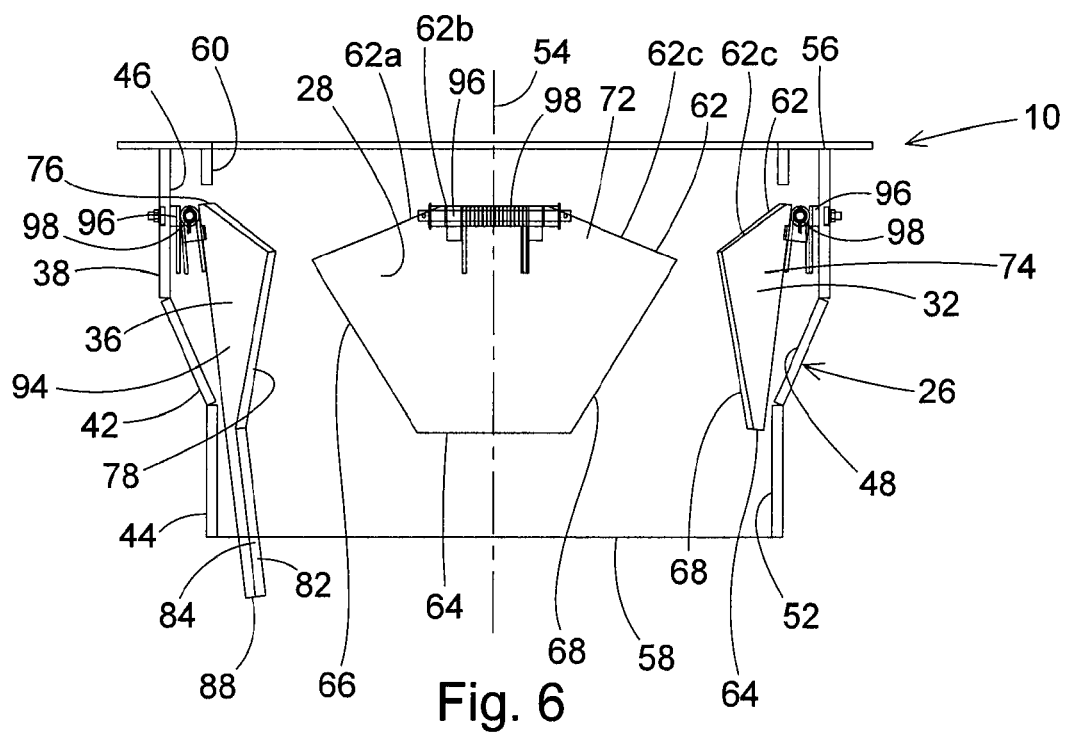
FIG. 6 is a side sectioned view of the apparatus with the apparatus plates in their opened positions.

A circular rim 60 extends radially inwardly from the tube large diameter section at the tube top edge 56. As best seen in FIGS. 3, 4, and 6, the rim 60 extends over the plurality of plates 28, 32, 34, 36 and protects the plates from material falling through the tube 26.

Figure 5:
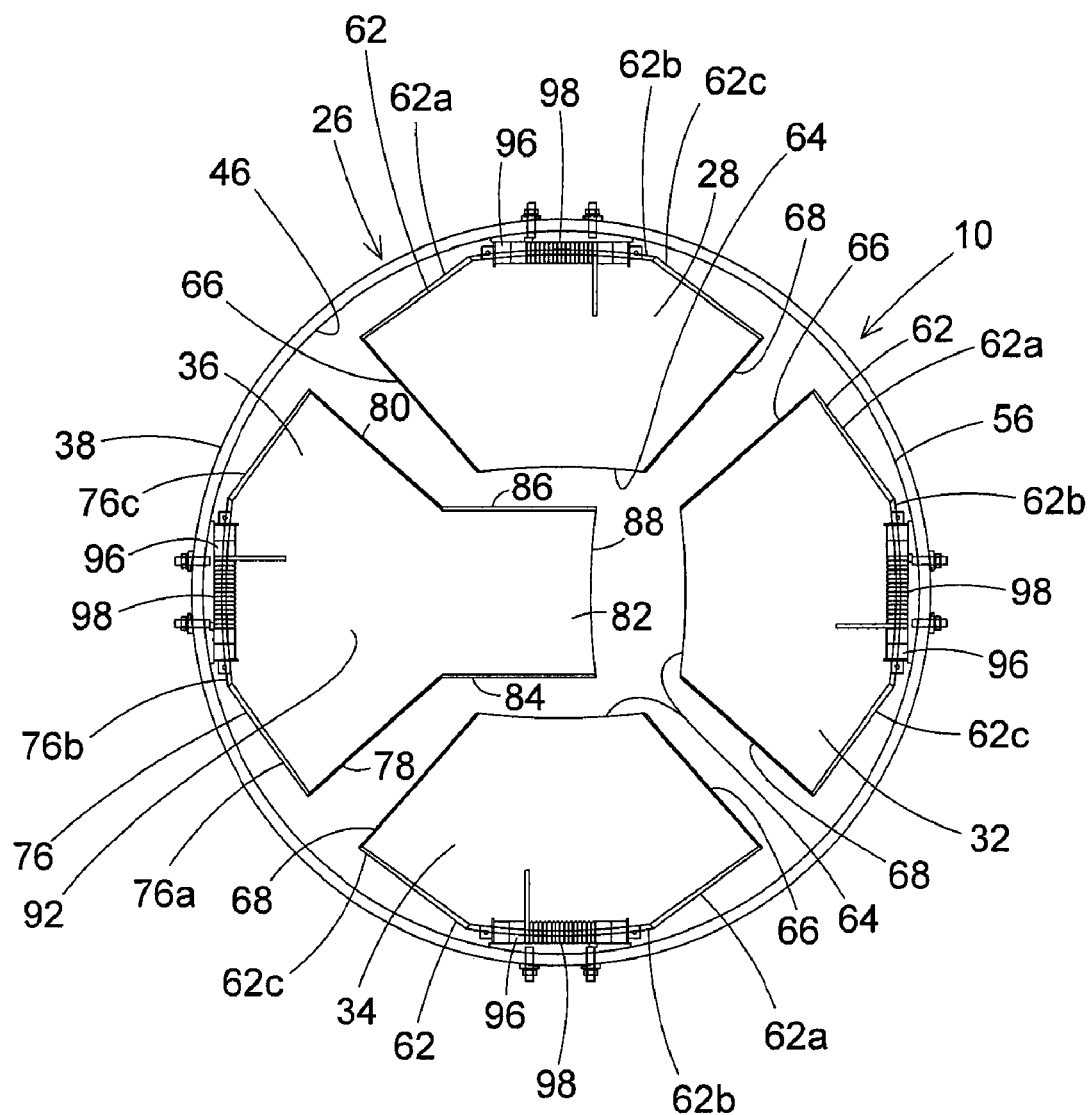
FIG. 5 is a top plan view of the apparatus plates shown in FIG. 4.

In the preferred embodiment, the plurality of plates include four plates 28, 32, 34, 36. In alternate, equivalent embodiments, a greater number or a lesser number of plates may be employed. Referring to FIGS. 4-7, three plates 28, 32, 34 have the same configuration. Each of these plates has a radially outer edge 62 positioned adjacent the tube interior surface 46, a radially inner edge 64 opposite the radially outer edge 62, and a pair of side edges 66, 68 between the radially outer edge 62 and the radially inner edge 64. As best seen in FIG. 5, each of the edges 62, 64, 66, 68 are straight edges, with the radially outer edge 62 being comprised of three straight edge sections 62A, 62B, 62C. The three straight edge sections, 62A, 62B, 62C enable the plate radially outer edger 62 to follow in close conformity to the curvature of the tube interior surface 46. Each of the plates, 28, 32, 34 also has opposite top 72 and bottom 74 surfaces. The plate top surfaces 72 have concaved curvatures and the plate bottom surfaces 74 have convex curvatures.

The fourth plate 36 has a configuration that is similar to the other three plates 28, 32, 34. The fourth plate 36 also has a radially outer edge 76 comprised of a three straight edge sections 76A, 76B, 76C, and two side edges 78, 82 that converge towards each other as they extend from the radially outer edge 76. The fourth plate 36 differs from the other three plates 28, 32, 34 in that it also has a rectangular section 82. The rectangular section 82 has parallel side edges 84, 86 that extend away from the plate radially outer edge 76 to a radially inner edge 88 of the rectangular section. Like the other three plates, the fourth plate 36 has a top surface 92 with a concave curvature, and an opposite bottom surface 94 with a convex curvature.

Figure 7:
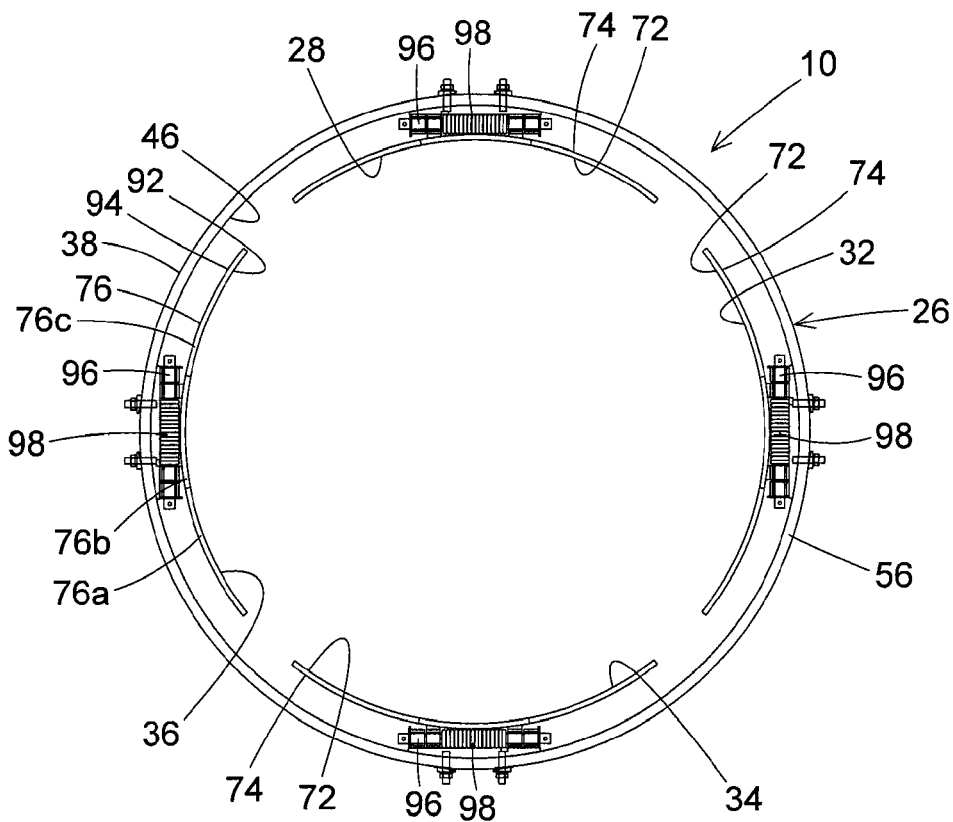
FIG. 7 is a top plan view of the apparatus plates shown in FIG. 6.

Each of the plates 28, 32, 34, 36 is connected to the tube 26 by a hinge pivot connection 96. The hinge pivot connections 96 are all positioned in the same horizontal plane that is oriented perpendicular to the tube center axis 54. As best seen in FIGS. 6 and 7, the hinge pivot connections 96 connect the interior sections 62B, 76B of the plate radially outer edges 62, 76 to the interior surface 46 of the tube large diameter section 38. In this position of the hinge pivot connections 96, the tube rim 60 covers the pivot connections and protects the pivot connections from bulk material falling through the tube 26. The hinge pivot connections 96 enable the plates 28, 32, 34, 36 to pivot between closed positions where the plates extends radially into the tube interior bore toward the tube center axis 54 as shown in FIGS. 4 and 5, and opened positions where the plates 28, 32, 34, 36 extend axially downwardly through the tube interior bore in the positions shown in FIGS. 6 and 7. As seen in FIGS. 4 and 5, when the plates 28, 32, 34, 36 are in their closed positions, they substantially obstruct the interior bore of tube 26. When the plates 28, 32, 34, 36 are moved to their opened positions shown in FIGS. 6 and 7, the curvatures of the plate top surfaces 72, 92 and the plate bottom surfaces 74, 94 enable the plates to closely conform to the cylindrical configurations of the tube interior surfaces 46, 48, 52 and thereby substantially eliminate any obstruction of bulk material falling through the interior bore of the tube 26.

A torsion coil spring 98 is provided on each of the hinge pivot connections 96. The springs 98 are operatively connected between the plates 28, 32, 34, 36 and the tube interior surface 46 to cause the plates to pivot to their closed, horizontal positions when there is no load on the plates from bulk material being transferred through the tube 26. The bias force of the springs 98 is sufficient to hold the plates 28, 32, 34, 36 in their closed positions shown in FIGS. 4 and 5. The force is also sufficient to allow bulk material dust to accumulate on the plate top surfaces 72, 92 when the conveyors 14, 18 are operated in an empty state. Thus, when no load is present on the closed, horizontally positioned plates 28, 32, 34, 36 the plates form a barrier across the interior bore of the tube 26 that prevents unrestricted air flow through the tube, and thereby prevents emission of dust from the transfer chute. When the first 14 and second 18 conveyors are being operated in an empty state, the flow of the fine residual material dust through the transfer chute and the tube 26 is restricted and the material dust settles on the top surfaces 72, 92 of the closed, horizontally positioned plates 28, 32, 34, 36.

The torsion coil springs 98 of the plates 28, 32, 34, 36 are designed such that they can only support slightly more than the weight of the plates themselves. Therefore, when bulk material is conveyed by the first conveyor 14 through the transfer chute 20 to the second conveyor 18, the collection of the transferred bulk material on the top surfaces 72, 92 of the plates 28, 32, 34, 36 causes the plates to pivot away from the closed, horizontal positions shown in FIGS. 4 and 5 toward their opened, vertical positions shown in FIGS. 6 and 7. Any residual dust that had collected on the top surfaces 72, 92 of the plates 28, 32, 34, 36 when in the closed, horizontal positions of the plates is then scoured away and combined with the flow of bulk material passing through the tube 26.

In this manner, the adjustable aperture apparatus of the invention limits the emission of bulk material dust from a transfer chute when a discharge conveyor that supplies bulk material to the transfer chute is being operated in an empty state.

What is claimed is:

1. An adjustable aperture apparatus that retains dust from material directed through the apparatus, the apparatus comprising:
   a tube having a cylindrical interior surface that surrounds an interior bore of the tube, the tube having a length that extends from a top edge of the tube that surrounds a top opening to the interior bore to a bottom edge of the tube that surrounds a bottom opening to the interior bore, the tube cylindrical interior surface having a center axis that extends through the tube interior bore and defines mutually perpendicular axial and radial directions relative to the tube;
   a plurality of plates in the tube interior bore, each plate having a radially outer edge positioned adjacent the tube interior surface, a radially inner edge opposite the radially outer edge and a pair of side edges between the radially outer edge and the radially inner edge with the pair of side edges converging as the pair of side edges extend from the radially outer edge toward the radially inner edge, and each plate having opposite top and bottom surfaces that face the respective top and bottom edges of the tube;
   a plurality of pivoting connections connecting the plurality of plates to the tube for pivoting movement of the plurality of plates between closed positions where the plurality of plates extend radially into the tube interior bore from the radially outer edges to the radially inner edges, and opened positions where the plurality of plates extend axially through the tube interior bore from the radially outer edges to the radially inner edges; and,
   a plurality of springs operatively connected between the plurality of plates and the tube with the plurality of springs urging the plurality of plates to the closed positions.

2. The apparatus of claim 1, further comprising:
   the tube being oriented with the tube length extending in a downward direction from the tube top edge to the tube bottom edge and with the center axis being oriented vertically; and,
   the plurality of plates being oriented horizontally in the closed positions and the plurality of plates being oriented vertically in the opened positions.

3. The apparatus of claim 1, further comprising:
   the radially outer edges of the plurality of plates being formed by a plurality of straight line edge sections that conform to the cylindrical interior surface of the tube.

4. The apparatus of claim 1, further comprising:
   the plurality of plates consisting of four plates.

5. The apparatus of claim 1, further comprising:
   the plurality of pivoting connections all being positioned in a single plane that is positioned perpendicular to the center axis.

6. The apparatus of claim 1, further comprising:
   the radially outer edges of the plurality of plates consisting of three straight line edge sections separated by two corners.

7. The apparatus of claim 1, further comprising:
the plurality of pivoting connections connecting the radially outer edges of the plurality of plates to the interior surface of the tube.

8. The apparatus of claim 1, further comprising:
the tube having a large diameter section and a small diameter section; and,
the plurality of pivoting connections connecting the plurality of plates to the tube large diameter section.

9. An adjustable aperture apparatus that retains dust from material directed through the apparatus, the apparatus comprising:
a tube having a cylindrical interior surface that surrounds an interior bore of the tube, the tube having a length that extends from a top edge of the tube that surrounds a top opening to the interior bore, to a bottom edge of the tube that surrounds a bottom opening to the interior bore, the tube cylindrical interior surface having a center axis that extends through the tube interior bore and defines mutually perpendicular axial and radial directions relative to the tube;
a plurality of plates in the tube interior bore, each plate having a radially outer edge positioned adjacent the tube interior surface, a radially inner edge opposite the radially outer edge, and a pair of side edges between the radially outer edge and the radially inner edge with the pair of side edges converging as the pair of side edges extend from the radially outer edge toward the radially inner edge, and each plate having opposite top and bottom surfaces that face the respective top and bottom edges of the tube;
a plurality of pivoting connections connecting the radially outer edge of the plurality of plates to the tube interior surface for pivoting movement of the plurality of plates between closed positions where the plurality of plates extend radially into the tube interior bore from the radially outer edges to the radially inner edges, and opened positions where the plurality of plates extend axially through the tube interior bore from the radially outer edges to the radially inner edges; and,
a plurality of springs operatively connected between the plurality of plates and the tube with the plurality of springs urging the plurality of plates to the closed positions.

10. The apparatus of claim 9, further comprising:
the tube having a large diameter section and a small diameter section; and,
the plurality of pivoting connections connect the radially outer edges of the plurality of plates to the tube interior surface in the tube large diameter section.

11. The apparatus of claim 9, further comprising:
the tube being oriented with the tube length extending in a downward direction from the tube top edge to the tube bottom edge and with the center axis being oriented vertically; and,
the plurality of plates being oriented horizontally in the closed positions and the plurality of plates being oriented vertically in the opened positions.

12. The apparatus of claim 11, further comprising:
the plurality of pivoting connections all being positioned in a single plane that is positioned perpendicular to the center axis.

13. The apparatus of claim 9, further comprising:
the radially outer edges of the plurality of plates being formed by a plurality of straight line edge sections that conform to the cylindrical interior surface of the tube.

14. The apparatus of claim 9, further comprising:
the plurality of plates consisting of four plates.

15. An adjustable aperture apparatus that retains dust from material directed through the apparatus, the apparatus comprising:
a tube having a cylindrical interior surface that surrounds an interior bore of the tube, the tube having a length that extends from a top edge of the tube that surrounds a top opening to the interior bore, to a bottom edge of the tube that surrounds a bottom opening to the interior bore, the tube cylindrical interior surface having a center axis that extends through the tube interior bore and defines mutually perpendicular axial and radial directions relative to the tube;
a plurality of plates in the tube interior bore, each plate having a radially outer edge positioned adjacent the tube interior surface, a radially inner edge opposite the radially outer edge, and a pair of side edges between the radially outer edge and the radially inner edge with the pair of side edges converging as the pair of side edges extend from the radially outer edge toward the radially inner edge, and each plate having opposite top and bottom surfaces that face the respective top and bottom edges of the tube, with each plate top surface having a concave curvature between the plate side edges;
a plurality of pivoting connections connecting the plurality of plates to the tube for pivoting movement of the plurality of plates between closed positions where the plurality of plates extend radially into the tube interior bore from the radially outer edges to the radially inner edges, and opened positions where the plurality of plates extend axially through the tube interior bore from the radially outer edges to the radially inner edges; and,
a plurality of springs operatively connected between the plurality of plates and the tube with the plurality of springs urging the plurality of plates to the closed positions.

16. The apparatus of claim 15, further comprising:
the tube being oriented with the tube length extending in a downward direction from the tube top edge to the tube bottom edge and with the center axis being oriented vertically; and,
the plurality of plates being oriented horizontally in the closed positions and the plurality of plates being oriented vertically in the opened positions.

17. The apparatus of claim 16, further comprising:
the concave curvatures of the top surfaces of the plurality of plates conforming to the cylindrical interior surface of the tube when the plurality of plates are in the opened positions.

18. The apparatus of claim 16, further comprising:
the plurality of pivoting connections all being positioned in a single plane that is positioned perpendicular to the center axis.

19. The apparatus of claim 16, further comprising:
the plurality of pivoting connections connect the radially outer edges of the plurality of plates to the interior surface of the tube.

20. The apparatus of claim 19, further comprising:
the tube having a large diameter section and a small diameter section; and
the plurality of pivoting connections connect the plurality of plates to the tube large diameter section.

21. An adjustable aperture apparatus that retains dust from material directed through the apparatus, the apparatus comprising:

a tube having a cylindrical interior surface that surrounds an interior bore of the tube, the tube having a length that extends downwardly from a circular top edge of the tube that surrounds a top opening to the interior bore, to a circular bottom edge of the tube that surrounds a bottom opening to the interior bore, the tube cylindrical interior surface having a center axis that extends through the tube interior bore and defines mutually perpendicular axial and radial directions relative to the tube;

a plurality of plates in the tube interior bore, each plate having a radially outer edge positioned adjacent the tube interior surface, a radially inner edge opposite the radially outer edge, and a pair of side edges between the radially outer edge and the radially inner edge with the pair of side edges converging as the pair of side edges extend from the radially outer edge toward the radially inner edge, and each plate having opposite top and bottom surfaces that face the respective top and bottom edges of the tube, with each plate top surface having a concave curvature between the plate side edges;

a plurality of pivoting connections connecting the radially outer edges of the plurality of plates to the tube interior surface for pivoting movement of the plurality of plates between closed positions where the plurality of plates extend radially from the radially outer edges to the radially inner edges, and opened positions where the plurality of plates extend axially downwardly from the radially outer edges to the radially inner edges; and, a plurality of springs operatively connected between the plurality of plates and the tube with the plurality of springs urging the plurality of plates to the closed positions.

22. The apparatus of claim 21, further comprising:

the concave curvatures of the top surfaces of the plurality of plates conforming to the cylindrical interior surface of the tube when the plurality of plates are in the opened positions.

23. The apparatus of claim 21, further comprising:

the radially outer edges of the plurality of plates being formed by a plurality of straight line edge sections that conform to the cylindrical interior surface of the tube.

24. The apparatus of claim 21, further comprising:

the plurality of plates consisting of four plates.

25. The apparatus of claim 21, further comprising:

the tube having a large diameter section and a small diameter section; and the plurality of pivoting connections connect the plurality of plates to the tube large diameter section.

\* \* \* \* \*